United States Patent [19]
Kosinski

[11] Patent Number: 4,991,391
[45] Date of Patent: Feb. 12, 1991

[54] SYSTEM FOR COOLING IN A GAS TURBINE

[75] Inventor: Andrew J. Kosinski, Winter Springs, Fla.

[73] Assignee: Westinghouse Electric Corp., Pittsburgh, Pa.

[21] Appl. No.: 302,489

[22] Filed: Jan. 27, 1989

[51] Int. Cl.[5] .............................................. F02C 7/16
[52] U.S. Cl. ................................. 60/39.182; 60/39.59; 60/39.83
[58] Field of Search ............... 60/39.182, 39.53, 39.59, 60/39.83, 728, 39.58; 415/114

[56] References Cited

U.S. PATENT DOCUMENTS

| | | | |
|---|---|---|---|
| 3,083,532 | 4/1963 | Cook | 60/39.66 |
| 4,338,780 | 7/1982 | Sakamoto et al. | 60/728 |
| 4,424,668 | 1/1984 | Mukherjee | 60/39.182 |
| 4,614,083 | 9/1986 | Teshima et al. | 60/39.53 |

FOREIGN PATENT DOCUMENTS 228338  6/1959  Australia .......................... 60/39.83

OTHER PUBLICATIONS

*The Aircraft Gas Turbine Engine and Its Operation,* Pratt & Whitney Aircraft Group; 1980, pp. 217, 218, 220.

Primary Examiner—Louis J. Casaregola
Attorney, Agent, or Firm—K. Bach

[57] ABSTRACT

A gas turbine is provided in which the quantity of cooling air required to cool the turbine is reduced by the evaporative cooling of air bled from the compressor discharge for cooling purposes. The evaporative cooling is accomplished by spraying pressurized water into a bleed pipe which diverts the cooling air from the compressor discharge to the turbine.

9 Claims, 2 Drawing Sheets

SYSTEM FOR COOLING IN A GAS TURBINE

BACKGROUND OF THE INVENTION

1. Field of the Invention

The present invention relates to gas turbines. More specifically, the present invention relates to the air bled from the compressor section of a gas turbine for use in cooling the turbine section and provides a method for cooling such air by evaporating water in the flow of such air.

2. Description of the Prior Art

A gas turbine is comprised of three main components: a compressor section in which air is compressed, a combustion section in which the compressed air is heated by burning fuel and a turbine section in which the hot compressed gas from the combustion section is expanded. To achieve maximum power output of the gas turbine, it is desirable to heat the gas flowing through the combustion section to as high a temperature as feasible. Consequently, the components in the turbine section exposed to the hot gas must be adequately cooled so that the temperatures of the materials which form these components are maintained within allowable limits.

This cooling is achieved by flowing relatively cool air over or within the turbine components. Since such cooling air must be pressurized to be effective, it is common practice to bleed a portion of the air discharged from the compressor section and divert it to the turbine components for cooling purposes. Although the cooling air eventually mixes with the hot gas expanding in the turbine, since it bypasses the combustion process, not all of the work expended in compressing the cooling air is recovered in the expansion process. Consequently, to maximize the power output and efficiency of the gas turbine, it is desirable to minimize the quantity of cooling air used.

Unfortunately, as a result of the temperature rise which accompanies the rise in pressure in the compressor, the air bled from the compressor is relatively hot, 600° F. to 800° F. depending on the compression ratio. Hence, it is well known in the art that the quantity of air bled from the compressor for cooling purposes can be reduced by cooling the air prior to directing it to the turbine components, thereby increasing its capacity to absorb heat.

One method commonly used to cool the cooling air utilizes and air-to-air cooler, whereby the air bled from the compressor flows through finned tubes over which ambient air is forced by motor driven fans, thereby transferring heat from the compressed air to the atmosphere. Although this method achieves adequate cooling, it suffers from two significant drawbacks. First, since the system requires an air cooler, interconnecting piping, structural support members, fans, motors and associated electrical controls, it adds significantly to the cost of the gas turbine. The second drawback concerns performance. The heat extracted from the compressed air in the cooler is lost to the atmosphere, thereby detracting from the thermodynamic efficiency of the gas turbine. In addition, the power required to drive the fans must be subtracted from that produced by the turbine, thereby reducing the net power output of the gas turbine.

A second method, used with gas turbines operating in a combined gas and steam turbine cycle system, employs an air-to-water cooler. According to this method, the air bled from the compressor flows over tubes in which boiler feedwater flows, thereby transferring heat from the compressed air to the feedwater. Although this method recovers the heat removed from the compressed air and returns it to the cycle, and hence does not suffer from the performance disadvantage of the method discussed above, it involves the considerable expense of an air-to-water cooler, subjects the turbine to damage from flooding in the event of a tube failure and requires a water circulating system for periods when the boiler is out of service.

It is therefore desirable to provide a system and method for cooling the air bled from the compressor for cooling purposes which is inexpensive, simple to operate, reliable and does not detract from the performance of the gas turbine.

SUMMARY OF THE INVENTION

Accordingly, it is the general object of the present invention to provide a method and system for cooling air bled from the compressor of a gas turbine.

More specifically, it is an object of the present invention to provide a system and method for cooling compressed air bled from a turbine compressor by evaporating water into the flow of such air.

It is another object of the invention to cool compressed air bled from a turbine compressor so that it may be advantageously used in cooling the turbine section of the gas turbine.

It is still another object of the invention to integrate a method for cooling compressor air into a combined gas and steam turbine cycle system, whereby a portion of the pressurized feedwater is diverted from the heat recovery steam generator for use in cooling the compressed air.

Briefly, these and other objects of the present invention are accomplished in a gas turbine system having a compressor for compressing air, a combustor for heating compressed air and a turbine for expanding and heated and compressed air. In accordance with the invention, a portion of the compressed air is diverted from the compressor and water is sprayed into the diverted air, cooling it by evaporation. The cool, moisture-laden air is then directed to the turbine portion of the system where it cools the components therein.

DESCRIPTION OF THE PREFERRED EMBODIMENT

Figure 1:
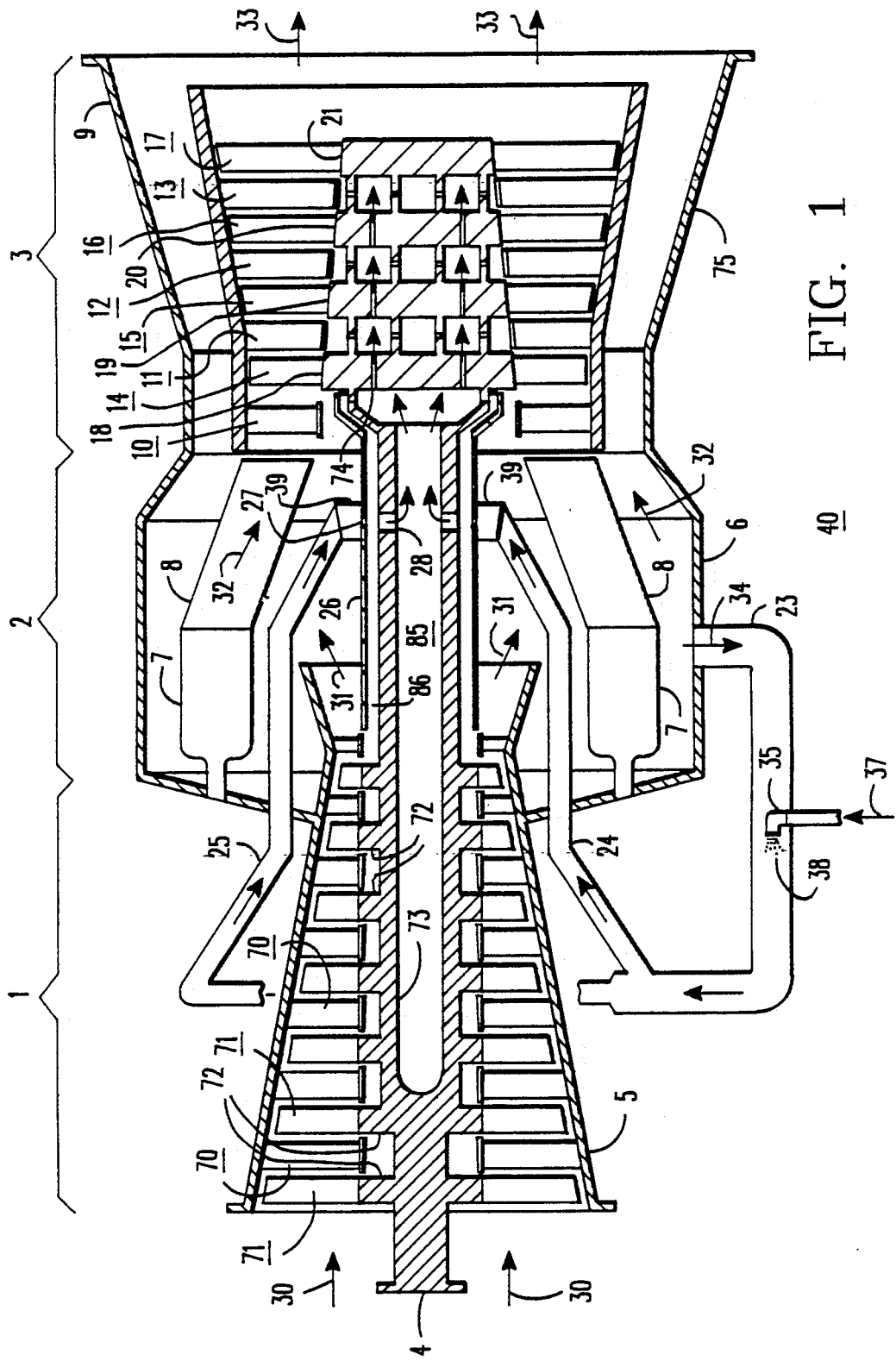
FIG. 1 is a longitudinal cross-sectional view of a gas turbine incorporating the cooling means of the present invention.

Referring to the drawings, there is shown in FIG. 1 a longitudinal cross-section of a gas turbine 40. The gas turbine is comprised of three main components: a compressor section 1, a combustion section 2, and a turbine section 3. A rotor 4 is centrally disposed in the gas turbine and extends through the three sections. The compressor section is comprised of a cylinder 5 which encloses alternating rows of stationary vanes 70 and rotating blades 71. The stationary vanes 70 are affixed to the cylinder 5 and the rotating blades 71 are affixed to a plurality of disks 72 which are axially spaced along the rotor shaft 73.

The combustion section 2 is comprised of a cylinder 6 which forms a chamber in which are disposed a plurality of combustors 7 and ducts 8 which connect the combustors to the turbine section. A portion of the rotor shaft extends through the combustion section and is enclosed therein by a housing 26. Also, cooling air return pipes 24 and 25, discussed further below, penetrate the cylinder 6 and extend through the chamber terminating at a manifold 39 which surrounds a portion of the housing 26.

The turbine section 3 is comprised of an outer cylinder 75 which encloses an inner cylinder 9. The inner cylinder 9 encloses alternating rows of stationary vanes 10-13 and rotating blades 14-17. The stationary vanes are affixed to the inner cylinder 9 and the rotating blades are affixed to a plurality of rotating disks 18-21 which form the turbine section of the rotor 4. The first of the rotating disks 18 is affixed to the end of the rotor shaft 73.

The compressor inducts ambient air 30 into its inlet and discharges compressed air 31 into the chamber 39 formed by the cylinder 6. The vast majority of the air 31 in the chamber enters the combustors 7 through holes therein, not shown. In the combustors, fuel is mixed with the compressed air and burned, thereby raising the temperature of the compressed air. The hot, compressed gas 32 then flows through the ducts 8 and thence through the alternating rows of stationary vanes 10-13 and rotating blades 14-17 in the turbine section, where it expands and generates power which drives the rotor 4. The expanded gas 33 then exits the turbine.

The rotating blades 14-17 and disks 18-21 in the turbine section are exposed to the hot gas from the combustors 7, which may be in excess of 2,000° F., and are subjected to high stresses as a result of the centrifugal force imposed on them by their rotation. Since the ability of the materials which form the blades and disks to withstand stress decreases with increasing temperature, it is vital to provide adequate cooling to maintain the temperature of these components within allowable levels. In the preferred embodiment, this cooling is accomplished by diverting a portion 34 of the compressed air 31 from the chamber formed by the cylinder 6 to the turbine section of the rotor. This diversion is accomplished by bleeding air through an external bleed pipe 23 emanating from the cylinder 6. The cooling air 34 re-enters the gas turbine through return pipes 24 and 25 after being cooled as explained below. The return pipes direct the air to the manifold 39 which, as previously explained, surrounds a portion of the housing 26 encasing the rotor. After entering the manifold, the cooling air penetrates the housing 26 through holes 27 and enters a gap 86 formed between the housing 26 and the rotor shaft 73. The cooling air then flows from the gap 86 through holes 28 in the periphery of the rotor shaft 73 and enters a hollow portion 85 of the rotor shaft. The cooling air flows from the hollow portion of the rotor shaft into the turbine section of the rotor through holes 74 in the rotating disks 18-20. Once in the turbine section of the rotor, the cooling air flows through a plurality of intricate cooling passages, not shown, in the rotating disks and blades to achieve the desired cooling.

It is important to note that the cooling air bypasses the combustors. Even though it eventually mixes with the hot gas expanding in the turbine, the work recovered from the expansion of the compressed cooling air through the turbine is much less than that recovered from the expansion of the compressed air heated in the combustors. In fact, as a result of losses due to pressure drop and mechanical efficiency, the work recovered from the cooling air is less than that required to compress the air in the compressor. Hence, the greater the quantity of cooling air used the less the net power output of the gas turbine.

In accordance with the present invention, the quantity of cooling air 34 bled from the compressor discharge is reduced by cooling the air and increasing its mass flow, thereby increasing its capacity to absorb heat from and cool the turbine components, prior to its entry into the return pipes 24 and 25. This is accomplished by evaporating water into the cooling air 34 as it flows through the bleed pipe 23. The transfer of the latent heat of vaporization from the cooling air to the water lowers the temperature of the air and the vaporized water increases its mass flow.

Evaporation is accomplished by supplying pressurized water 37 to a spray nozzle 35. The spray nozzle is disposed in the external bleed pipe 23 to insure adequate vaporization of the water before the cooling air is returned to the gas turbine, thus preventing thermal shock as a result of liquid water droplets impinging on the hot turbine components. The spray nozzle may be of the type conventionally used in steam turbine de-superheaters and is selected to provide sufficiently fine droplets 38 to ensure good evaporation. The specific spray nozzle selected depends primarily on the quantity of water flow the nozzle must pass, which is dependent on the decrease in cooling air temperature disired, the the pressure differential between the water and the cooling air.

To insure good spray characteristics from the nozzle, the pressure of the water supplied to the nozzle should be 50 to 150 psi higher than that of the cooling air, which is at the discharge pressure of the compressor. Since the compressors of modern gas turbines operate at discharge pressures in the range of 150 to 250 psig, in the preferred embodiment water is supplied to the nozzle at pressures in the 250 to 300 psig range.

It should be noted that according to the present invention, the heat removed from the cooling air to lower its temperature is not lost to the atmosphere, as in some of the prior art methods, but is added to the water which, along with the cooling air, mixes with the combusted air in the turbine and produces additional power.

In addition, since the water vapor replaces some of the cooling air, the quantity of air which must be bled from the compressor is reduced. Reducing the air bled from the compressor increases the flow of hot gas through the turbine and therefore the power output of the gas turbine. Since in modern gas turbines the power output of the turbine increases by about 250 to 350 kilowatts for each additional pound per second of gas flow through the turbine, each pound per second of water evaporated into the cooling air allows a reduction of one pound per second in the air bled from the compressor and yields a corresponding 250-350 additional kilowatts of power output from the turbine.

Although reducing the cooling air temperature is desirable (since, as previously explained, it reduces the quantity of cooling air which must be bled from the compressor discharge) it is unwise to reduce the cooling air temperature below a certain value. This is so because although the cooling air lowers the temperature of the turbine components, and hence increases their ability to withstand stress, it also increases the thermal gradients, and hence the thermal stresses, in these components. There is therefore an optimum cooling air temperature which results in adequate cooling of the turbine components without generating excessive thermal stress.

The quantity of water flow required depends primarily on the quantity of air used for cooling and hence can be expressed as a ratio of pounds of water per pound of cooling air. To maintain the aforementioned optimum cooling air temperature, this ratio must be varied with the temperature of the air bled for cooling (which in turn varies with the power output of the gas turbine and the temperature of the incoming ambient air) and the temperature of the water supplied to the spray nozzle.

By way of illustration, if at the maximum power output of the gas turbine the temperature of the cooling air bled from the compressor is in the range of 715° to 745° F., the temperature of the water is in the range of 225° to 265° F. and the optimum cooling air temperature is 375° F., then the ratio and the of water to cooling air is in the range of 0.075 to 0.085. These figures indicate the maximum ratio of water to cooling air required since the maximum water requirement would occur at maximum power output. This is so because at the maximum power output the temperature of the cooling air bled from the compressor is at its maximum value. As can be seen these figures indicate a relatively small quantity of water is required to cool the cooling air to a temperature in an optimum range of 375° F. ±5%.

Since the temperature of the cooling air bled from the compressor varies as explained above, the quantity of water evaporated must be varied in order to maintain the temperature of the cooling air at its optimum value. Therefore, according to the invention, the flow of pressurized water to the spray nozzle is varied by use of a flow control valve 80, shown in FIG. 2, disposed in the pressurized water supply line 53. The amount, or quantity of water injected can be increased by using warmer water. The maximum injection is that amount of water that maintains a 50° F. superheat of the water vapor in the mixture. For an outlet temperature of the mixed cooling air of 375° F., then the saturation temperature of the water vapor is limited to about 325° F.

It is well known that impurities in raw water, especially certain metals such as sodium and potassium, can result in corrosion of the turbine components at the high temperatures existing in the turbine. Hence it is desirable to treat the water by removing as much of the dissolved solids as possible before evaporating it into the cooling air. Methods for adequately treating water are well known in the art and include chemical treatment, ion exchange and de-mineralization.

Figure 2:
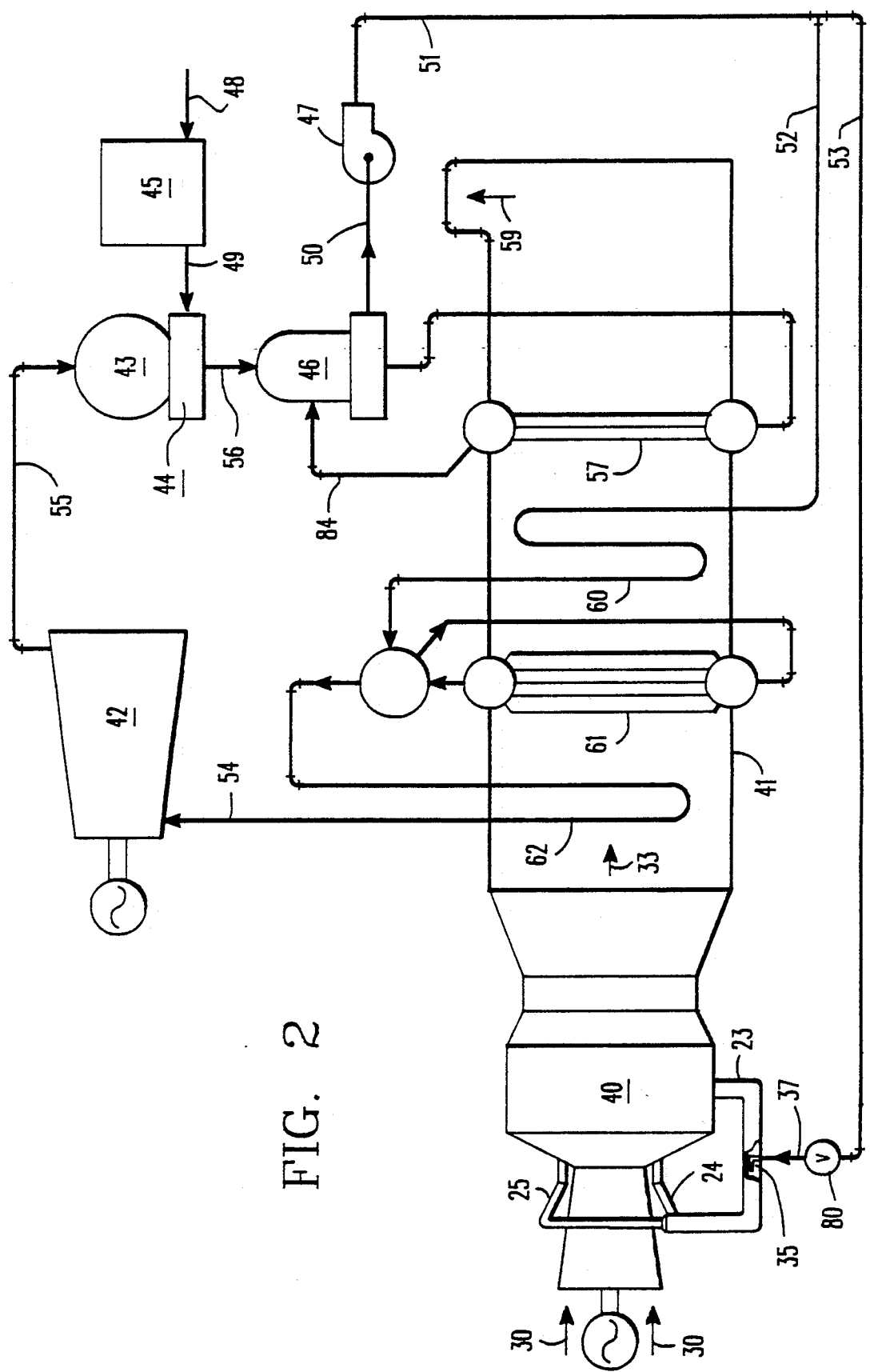
FIG. 2 is a schematic diagram of a combined gas and steam turbine cycle system showing the integration of the present invention into such a system.

The present invention may be especially advantageously used in a gas turbine operating in a combined gas and steam turbine cycle system. Such a system is shown in FIG. 2. As is typical in such systems, the gas 33 exhausting from the gas turbine 40 flows through a heat recovery steam generator. The heat recovery steam generator is comprised of a superheater 62, high pressure evaporator 61, economizer 60, and low pressure evaporator 57. After flowing through the heat recovery steam generator and yielding much of its latent heat to the production of steam, the exhaust gas 59 is vented to atmosphere.

In the system shown in FIG. 2, the steam 54 produced by the heat recovery steam generator expands in a steam turbine 42, thereby producing additional power.

The steam 55 discharging from the steam turbine is condensed in a condenser 43, the condensate being temporarily held in the condenser hot well 44. Since water is inevitably lost from the system through leakage, drum blowdown, etc., make-up water 49 is added to the hot well 44 as required. The make-up water is produced by treating raw water 48 in the water treatment plant 45 using the well-known methods previously discussed.

The mixture of condensate and make-up water 56 is heated and deaerated in a deaerator 46 using steam 84 from the low pressure evaporator. The heated and deaerated water 50 from the deaerator is then pressurized in a boiler feed pump 47. According to the current invention, the cooling method disclosed is integrated into the system by splitting the discharge 51 from the boiler feed pump into two portions; portion 52 enters the economizer portion 60 of the heat recovery steam generator, and portion 53 is supplied to the spray nozzle 35. Since typically the deaerator operates at pressures in the 20 to 40 psig range, the temperature of the water supplied to the nozzle will be in the 225° to 265° range. A flow control valve 80 regulates the quantity of flow to the spray nozzle as previously discussed. Thus, by integrating the present invention into a combined gas and steam turbine cycle system as described herein, the advantages of the present invention can be obtained by relatively minor increases in equipment cost, specifically, increasing the capacity of the existing water treatment plant 45 and the boiler feed pump 47.

Thus, it can be seen that the method of cooling the cooling air according to the present invention provides the following advantages:

(i) reduced equipment costs, especially according to the embodiment of the invention as incorporated into a combined gas and steam turbine cycle system, (ii) increased power output of the gas turbine, (iii) no need to modify the internal turbine cooling scheme since the amount of water added is relatively small and the fluid properties of the cooling air remains essentially the same.

I claim:

1. A gas turbine system comprising:
   (a) a compressor section for compressing air,
   (b) a combustion section connected to receive air from said compressor section and to produce hot compressed gas by burning fuel in said received compressed air,
   (c) a turbine section connected to receive gas from said combustion section and for expanding said heated compressed gas,
   (d) a chamber between said compressor section and said combustor section for collecting said compressed air,
   (e) communicating means for diverting some of said air in said chamber to said turbine,
   (f) means for evaporating water in said diverted air upstream from said turbine section, thereby cooling said air diverted to said turbine section,
   (g) a water supply, means for directing water from said water supply to said evaporating means, and
   (h) means for heating said water prior to said evaporating, said heating means in water flow communication with said water supply means.

2. The gas turbine system according to claim 1 further comprising first, second and third cylinders enclosing said compressor, combustion and turbine sections, respectively, and wherein said communicating means comprises a pipe external to said cylinders, said spraying means being disposed in said pipe.

3. The gas turbine system according to claim 1 wherein said heating means has means for transferring heat from said gas expanded in said turbine to said water, said heating means in gas flow communication with said turbine section.

4. The gas turbine system according to claim 3, wherein said heating means comprising a steam generating evaporator and a deaerator for heating said water into the 225°–265° F. temperature range, said deaerator in steam flow communication with said steam generating evaporator.

5. The gas turbine system according to claim 4 further comprising means for reducing the quantity of dissolved solids in said water, said dissolved solids reducing means in water flow communication with said water supply.

6. A gas turbine system comprising:
 (a) a compressor section for compressing air,
 (b) a combustion section connected to receive air from said compressor section and to produce hot compressed gas by burning fuel in said received compressed air,
 (c) a turbine section connected to receive gas from said combustion section and for expanding said heated compressed gas,
 (d) a chamber between said compressor section and said combustor section for collecting said compressed air,
 (e) communicating means for diverting some of said air in said chamber to said turbine,
 (f) means for evaporating water in said diverted air upstream from said turbine section, thereby cooling said air diverted to said turbine section, said evaporating means having means for spraying said water into said diverted air, and
 (g) means for providing water to said evaporating means at a temperature within the range of 225° to 265° F., said means for providing water having:
  (i) a heat recovery steam generator connected to receive expanded gas exhausted from said turbine section, having means for generating steam by transferring heat from said exhausted gas to pressurized water,
  (ii) means for storing water,
  (iii) means for pressurizing said water from said storage means,
  (iv) means for connecting said pressurized water means to said heat recovery steam generator to provide pressurized water thereto, and
  (v) means for diverting a portion of said pressurized water to said spraying means.

7. In a gas turbine having a compressor section for providing compressed air, a combustion section connected to receive air from said compressor section and to produce hot compressed gas by burning fuel in said received compressed air, a turbine section connected to receive gas from said combustion section and for expanding said heated compressed gas, a rotor centrally disposed within said turbine section, cooling means for cooling air bled from said compressor section for cooling said turbine section, comprising:
 (a) a bleed pipe through which said cooling air bled from said compressor section flows,
 (b) a spray nozzle disposed in said bleed pipe,
 (c) means for supplying water to said spray nozzle, said spray nozzle providing water vapor in said cooling air in said bleed pipe,
 (d) means for varying the quantity of said water supplied to said spray nozzle, thereby maintaining the temperature of said cooling air flowing in said bleed pipe in a predetermined range, said water supply varying means disposed in said water supply means, and
 (e) means for heating said water prior to said spraying, thereby increasing the quantity of water spray required to maintain said temperature of said cooling air in said predetermined range.

8. In a gas turbine system having a compressor section for producing compressed air; a combustor adapted to receive a first portion of said compressed air and heat said first portion of said compressed air by burning fuel therein, thereby producing hot compressed gas; a turbine section for expanding said heated compressed gas, said turbine section connected to receive said hot compressed gas from said combustor; a pipe adapted to receive a second portion of said compressed air produced by said compressor and to direct said second portion of said compressed air to said turbine, thereby bypassing said combustor; a water supply for supplying water; first and second means for transferring heat from said gas expanded in said turbine section to water from said water supply, said first and second heat transfer means connected to receive said expanded gas from said turbine section; means for pressurizing water, said pressurizing means connected to receive said water heated in said second heat transfer means, said first heat transfer means connected to receive a first portion of said water from said pressurizing means; an apparatus for cooling said second portion of said compressed air, comprising:
 (a) means for spraying pressurized water, said spraying means disposed in said pipe, and
 (b) means for directing a second portion of said water from said pressurizing means to said spraying means, whereby said second portion of said water is sprayed into said pipe.

9. The gas turbine according to claim 8 wherein:
 (a) said first heat transfer means comprises an economizer, a first evaporator and a superheater;
 (b) said second heat transfer means comprises a second evaporator and a deaerator;
 (c) said pressurizing means comprising a boiler feed pump; and
 (d) said water supply comprises a condenser hot well.

* * * * *